United States Patent [19]

Dore et al.

[11] 4,276,698
[45] Jul. 7, 1981

[54] MACHINES FOR MEASURING THE DIMENSIONS OF WORKPARTS

[75] Inventors: Alain Dore, Conflans-Ste-Honorine; Henri Judet, Paris, both of France

[73] Assignee: Societe D'Applications Generales D'Electricite et de Mecanique Sagem, Paris, France

[21] Appl. No.: 953,999

[22] Filed: Oct. 23, 1978

Related U.S. Application Data

[63] Continuation of Ser. No. 738,884, Nov. 4, 1976, abandoned.

[30] Foreign Application Priority Data

Nov. 7, 1975 [FR] France ................................ 75 34141

[51] Int. Cl.² ........................... G01B 3/22; G01B 5/20
[52] U.S. Cl. .................................. 33/174 L; 33/1 M; 33/169 R
[58] Field of Search ................ 33/174 L, 174 P, 1 L, 33/169 R, 100, DIG. 3, 1 M; 356/138, 152, 153, 156, 172; 250/208, 211, 222

[56] References Cited

U.S. PATENT DOCUMENTS

| | | | |
|---|---|---|---|
| 3,596,362 | 8/1971 | Reason | 33/174 P |
| 3,617,131 | 11/1971 | Taguchi | 356/152 |
| 3,774,312 | 11/1973 | Esch | 33/174 L |
| 3,813,789 | 6/1974 | Shelton | 33/174 L |

*Primary Examiner*—Willis Little
*Attorney, Agent, or Firm*—Daniel M. Rosen

[57] ABSTRACT

A machine for measuring the dimensions of a workpiece, comprising a base plate for receiving the workpiece and a mechanical structure carrying a feeler for movement along three orthogonal axes at right angles by means providing for direct measuring of the amounts of movement of the feeler along the axes. Optical deviation measurement means determine the errors due to deformation of the components, lost motion as well as pitch, yaw and/or roll of the movable components. The corrections to be applied to the data delivered by the measuring means are computed and may be made automatically for the display to be free of errors.

8 Claims, 8 Drawing Figures

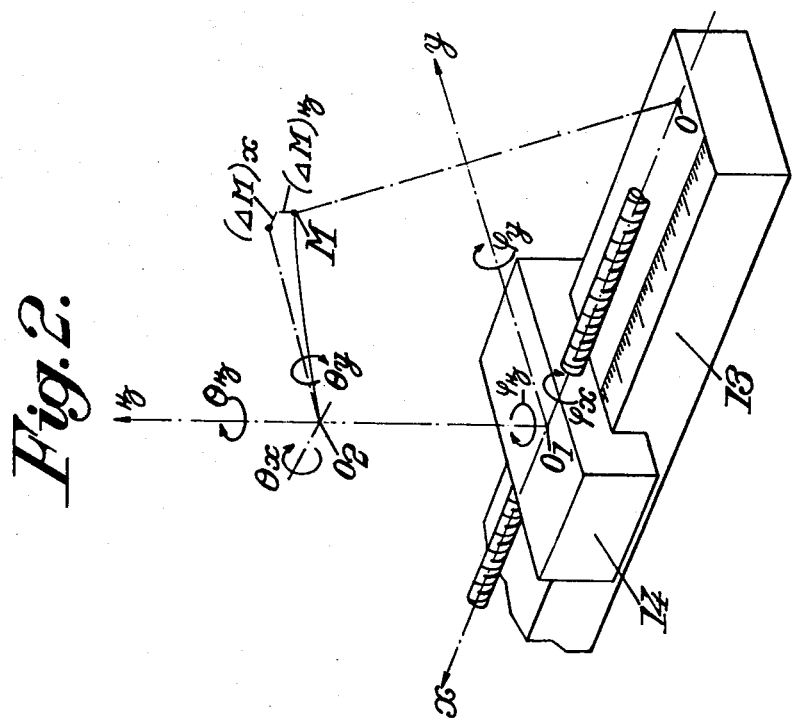
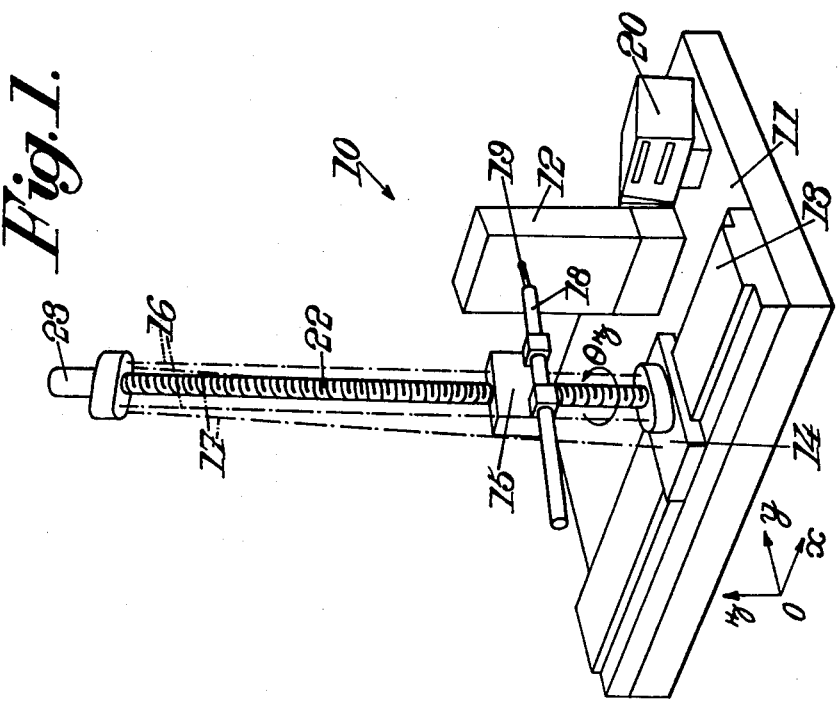

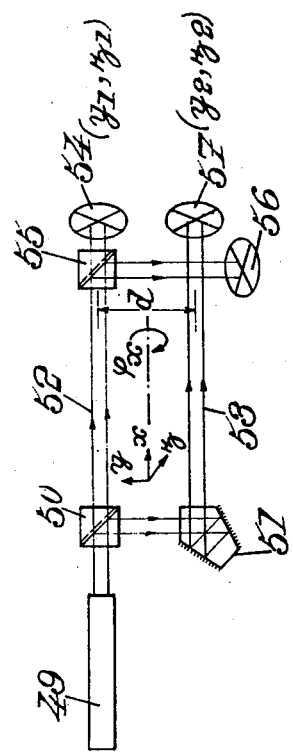
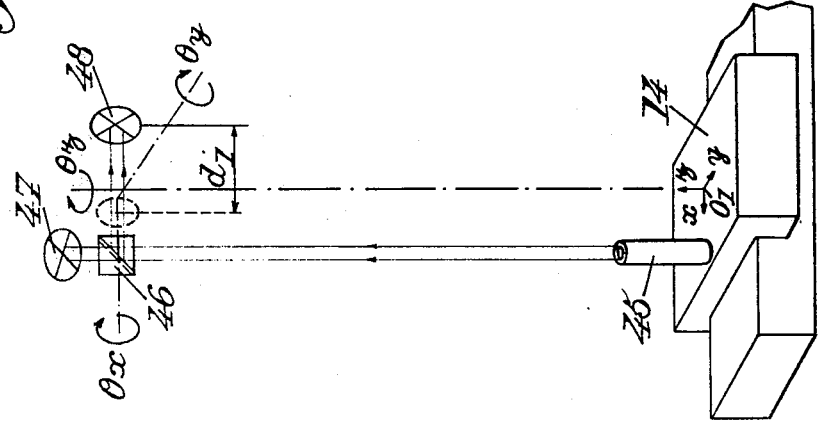

MACHINES FOR MEASURING THE DIMENSIONS OF WORKPARTS

This is a continuation, of application Ser. No. 738,884, filed Nov. 4, 1976 now abandoned.

BACKGROUND OF THE INVENTION

This invention relates to machines for the measurement, the marking and/or the accurate checking of workparts, and notably of workparts of large size.

Machines for coordinate measuring along three directions fulfill one requirement of the industry: any mechanical workpiece must conform to a drawing and, after machining, a check is frequently carried out on the finished part, to ensure that it is indeed in compliance with the numerical data of the drawing.

In fact, all cutting machines include deviation factors which are translated into errors in the dimensions of the finished part. Such errors are due to deformations of the machines, of the workpiece and of the tool, to thermal effects, to the stresses and to lost motions.

The most currently applied remedy consists of machining the parts by repeating the same operation several times, to effect successively a blanking, a pre-finishing and a finishing step. The finishing consists of a simple "stroking" of the metal, that is to say of a machining without substantial applied force thus eliminating factors of inaccuracy due to stresses.

Notwithstanding however, errors persist and precision machining must be followed by checking operations.

These checks are carried out by means of measuring machines, which must give the dimensions of the part (which the cutting machine cannot do) and must have an accuracy very much higher than that of the cutting machines.

Three-dimensional coordinate measuring and marking machines are known comprising a tracer finger or a stylus pin displaceable along three perpendicular axes x, y and z by means of a motion transmitting mechanism and comprising a system for measuring the position of the tracer finger along the three axes. Since these machines include mechanical parts, they remain subject to a certain number of measurement deviation and error factors, even though they do not have to transmit substantial forces. In particular, these machines remain subject to thermal effects and to the presence of backlash or lost motion. In practice, due to the presence of the transmitting mechanism, an accuracy of some hundredths of a millimeter in machines for measuring parts of large dimensions, such as for example, engine crank cases, is not presently exceeded.

It might be thought that the shortcomings of present measuring machines can be avoided by substituting optical measurements for measurement by means of a mechanical linkage. In fact, this solution does not comply fully with industrial requirements in the use of such machines, which should preferably provide direct reading on a rule or on a display device.

A prior art machine (French Pat. No. 2 088 675) for measuring the dimensions of parts includes optical interferometers and a servocircuit for correcting the errors due to yaw of a carriage along a track. The resultant system is complex and it would hardly be possible to extend that type of correction to all mechanical inaccuracies which result in first order errors.

It is an object of the invention to provide an improved machine for measuring the dimensions of workpieces. It is a more specific object to provide a machine which is highly accurate and however uses a mechanical supporting structure for the tracer finger or stylus pin, with the attendant advantage that use is easy since it involves simply bringing this finger or pin to the point on the workpiece whose dimensions have to be determined.

According to the invention, there is provided a machine for measuring the dimensions of a workpiece, comprising a faceplate for receiving the workpiece and a mechanical structure carrying a feeler for movement along axes at right angles by means providing for direct measuring of the amounts of movement of the feeler along said axes. Means are provided for determining by optical deviation measurement the measuring errors due to lost motion and deformation of the components of the mechanical structure along at least one of said axes. The corrections to be applied to the data delivered by the measuring means are computed and may be made automatically for the display to be free of errors.

The means for determining the errors corresponding to the movement along one of the axes may comprise a source, such as a laser, positioned close to the origin of the axis, emitting a cylindrical light beam parallel to the theoretical axis of movement and a detector of the deviations of a member movable along said axis with respect to the theoretical axis, positioned on the movable member.

The invention is also applicable to a cutting machine, the feeler being replaced by a tool and the measuring means by devices for controlling the movement of the tool along a predetermined pattern.

In the case of a machine including, along at least one of said axes, means for direct measurement by a reader, for example an incremental reader, borne by a member movable along said axis, cooperating with a scale borne by said axis and providing the indication of the movements in digital form, said means for determining the errors may comprise an analog-digital converter and a computer which receives the data supplied by the reader and by the analog-digital converter and supplies a correct measurement to a display device.

Anyway the mechanical structure acts as a support only; the direct measuring means gives a first approximation of the amount of movement of the finger, which approximation can be corrected either by the operator, or automatically by an associated electronic system, receiving the results of the deformation or deviation measurement, the deformation being always very small with respect to the movement proper. The optical system may be extremely simple and have a constitution which bears some similarity with that of optical guidance devices used for guiding missiles.

The invention will be better understood from a consideration of the following description of a machine which constitutes a particular embodiment thereof, given by way of non-limiting example, with reference to the accompanying drawings.

BRIEF DESCRIPTION OF THE DRAWINGS

FIG. 1 is a diagrammatic isometric view of the main mechanical components of the machine;

FIG. 2 is a schematic diagram showing the axes of movement and the deformations or errors along these axes;

FIGS. 7 and 8 show diagrammatically devices for measuring or checking other errors.

DETAILED DESCRIPTION OF THE INVENTION

Figure 3:
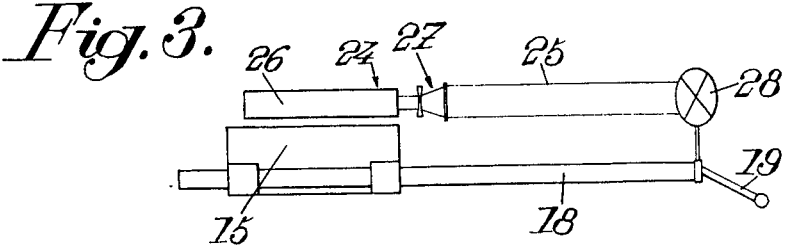
FIG. 3 is a schematic view of the device for determining errors due to deformations transverse to the direction of translation of one of the mechanical components (here the arm bearing the feeler)

Referring to FIGS. 1 and 2, the measuring machine 10 has a generally mechanical structure which is conventional. It comprises a base plate 11 with a flat horizontal surface adapted to receive the part 12 to be measured, marked or checked. The base plate 11 bears a measuring bench 13 on which a carriage 14 is mounted to be slidable along the direction Ox. The carriage 14 is provided with guide members for accurately maintaining it on the bench 13, for example transverse rollers rolling along tracks secured to the bench and support rollers forcibly applied against the central portion of the bench (not shown).

The carriage 14 carries means for vertical movement of a movable headstock 15 (movement along direction $O_1z$); in FIGS. 1 and 2 two machined columns 16 assembled with reinforcing rods 17 are carried by carriage 14. Ball-bearings (not shown) carried by the headstock 15, roll on the columns 16.

Finally, the headstock 15 carries an arm 18 setting the direction $O_2y$, axially displaceable in bearings fixed on the movable headstock 15. Arm 18 carries the feeler 19 intended to contact the part 12.

The amounts of movement of the carriage 14 with respect to the origin O, of the headstock 15 with respect to the origin $O_1$ (carriage 14) and of the arm 18 with respect to the origin $O_2$ (headstock 15) may be measured by various means. All means may be with direct visual reading. On the other hand, in the embodiment given by way of example, the displacement in the direction $O_2y$ is read directly on a graduated rule borne by the arm 18. A similar rule is drawn by the bench 13, but the amount of movement along Ox (controlled by an electric motor) is measured by a counting system including an incremental optical reader mounted on the carriage 14 and moving in front of a scale borne by the bench. A similar counting system measures the amount of rotation of an electric motor 23 driving the screw 22 actuating the headstock 15. The results are shown digitally on a display unit 20.

Whatever the reading means, there are measurement errors due notably:

to lack of orthogonality between the actual directions of movement along Ox, $O_1y$ and $O_2z$, to mechanical deformations, mechanical clearances and lost motion during operation of the machine.

These imperfections do not all have the same incidence on the accuracy of measurement. It suffices generally to correct only certain of them, the number of which varies according to the desired accuracy. To show the effect of the various factors, it may be useful to give some theoretical indications. The notations indicated in FIG. 2 will be used to designate the errors which affect measurement when the feeler 19 is in contact with the part 12 at the point M.

$x_m$, $z_m$ and $y_m$ will be used to denote the measurements given by the system which measures the amounts of movements and is carried by the mechanical components of the machine (that is to say, the measurements of $OO_1$, $O_1O_2$ and $O_2M$) and x, y and z to denote the measured and true coordinates of point M with respect to origin O.

A first source of error is constituted by the lack of orthogonality of direction $O_2M$ with respect to plane $OO_1O_2$: it may notably be due to a defective initial adjustment or to insufficient guidance of the headstock 15. It combines with flexure of the sliding arm. $(\Delta M)_x$ and $(\Delta M)_z$ will designate the errors which result therefrom in the directions x and z (FIG. 2).

The movements along the direction z also cause errors. First, errors are due to defective axial movement of the headstock 15. Other errors are due to defective guidance, arising from roll, pitch and/or yaw movements of the headstock 15. $(\Delta O_2)_x$ and $(\Delta O_2)_y$ will be used to denote the errors in the translation of the headstock 15 (which constitutes point $O_2$) and $\theta_x$, $\theta_y$ and $\theta_z$ will denote the roll, pitch and yaw movements (that is to say around the axis of rectilinear movement of the headstock, around the direction of movement of the arm with respect to the headstock, and around an axis perpendicular to the two foregoing ones).

Lastly, the errors in measuring the amount of axial movement of the carriage 14 and the limitations of guidance of the carriage cause the following additional errors to appear:

$(\Delta O_1)_y$ and $(\Delta O_1)_z$, that is to say errors of axial movement along the directions y and z, $\phi_x$, $\phi_z$ and $\phi_y$, that is to say, roll, pitch and yaw guidance errors.

A simple calculation shows that the dimensions x, y and z of point M are deduced from the measured magnitudes $x_m$, $y_m$ and $z_m$ by the formulae, valid to about the second order:

$$\begin{cases} x = x_m + y_m(\theta_z + \phi_z) + z_m \phi_y + \qquad (\Delta O_2)_x + (\Delta M)_x \\ y = y_m + \qquad\qquad\qquad z_m \phi_x + (\Delta O_1)_y + (\Delta O_2)_y \\ z = z_m + y_m(\theta_x + \phi_x) + \qquad (\Delta O_1)_z + \qquad (\Delta M)_z \end{cases} \quad (1)$$

On account of the mechanical features of the machine, some sources of errors can be disregarded, whilst others—more or less numerous according to the accuracy sought—are taken into account in the correction approach. In addition, it is possible to reduce substantially the faults due to flexing by positioning the part so that $y_m$ and/or $z_m$ are minimum.

In a machine of the above-defined type, the errors of axial movement $\Delta O_1$ and the amounts of rotation $\phi_y$ and $\phi_z$ are small, provided that the carriage runway is correctly trued and that the support base for the guide rollers of the carriage 14 is wide. If however a higher degree of precision is required, corrections based on the measurement of $\Delta O_1$, of $\phi_y$ and $\phi_z$ can be introduced, using the same approaches as those defined below.

In the same way, as regards movement in direction $O_1z$, the orthogonality of the translation $O_1O_2$ with the plane Oxy and the rigidity of rods 16 may be rendered sufficient in the majority of cases for the faults $(\Delta O_2)$, $\theta_x$ and $\theta_y$ (the latter being besides without effect to about the second order) to be negligible.

The remaining faults may be classified as follows, in order of decreasing importance:
errors $(\Delta M)_x$ and $(\Delta M)_z$
errors $y_m\,\theta_z$, $z_m\,\phi_x$ and $y_m\,\phi_x$, which necessitate the measurement of $\theta_z$ and $\phi_x$.

Then formula (1) may be simplified as follows:

$$\begin{cases} x = x_m + y_m\,\theta_z + (\Delta M)_x \\ y = y_m + z_m\phi_x \\ z = z_m + y_m\phi_x + (\Delta M)_z \end{cases} \quad (2)$$

The measurement of $(\Delta M)_x$ and $(\Delta M)_x$ can be carried out by means of the device shown diagrammatically in FIG. 3. This device includes a light source 24 delivering a beam of light 25, cylindrical and parallel to the axis $O_2y$, borne by the movable headstock 15. This source may be constituted by a laser 26: such a source has the advantage of providing a substantially cylindrical light beam. An a focal optical system 27 may be provided to reduce the divergence of the laser beam itself. As an example, a helium-neon laser which provides a light in the visible spectrum may be used. The device includes a deviation measuring detector placed at the end of the arm 18 and which receives the beam 25. The detector is of the type supplying measurements of two deviations, one in the direction Ox and the other in the direction Oz. Detector 28 may consist of a four quadrant photoelectric cell or a surface-effect light detector.

In the embodiment illustrated, the detector has two sectors which are horizontally opposed and two sectors which are vertically opposed. The two signals delivered by the two "horizontal" quadrants are compared by applying them to the two inputs of an analog subtractor (differential amplifier for example): the output voltage of the subtractor is thus proportional to $(\Delta M)_x$. The two signals from the "vertical" quadrants are compared in the same way.

If, as indicated above, $x_m$ is supplied directly in digital form by an incremental optical reader, the correction $\Delta x_m$ is typically combined with $x_m$ directly and automatically before display on the unit 20, which thus gives x directly.

In most cases, the measuring sequence will be as follows: the feeler 19 is brought into contact with the part 12 to be measured at a point which will be used as origin or reference, hence will correspond to $x_m = 0$. The corresponding value of $\Delta x_m$ is digitized, for example by applying the output voltage from the subtracting circuit to a numerical voltmeter. The value of $\Delta x_m$ is stored in a memory of the display unit 20, which can also store, for additional correction, the diameter of the ball constituting the end of the feeler 19. The machine is then actuated to bring the feeler 19 into contact with the part 12 at another point thereof. The movement along the direction x is measured by the incremental reader borne by the carriage 14. On renewed contact, a conventional computing circuit (which may be quite simple and straightforward since it can consist of an adder-subtractor) provides the dimension x from $x_m$ supplied by the reader, from the diameter of the ball stored in the memory (if the contacts have been on opposite faces of the part) from the stored value of $\Delta x_m$ corresponding to the origin and from the value of $\Delta x_m$ at the new contact point.

All that has just been said in respect of measurement of x is valid also as regards the measurement of the other dimensions.

Figure 4:
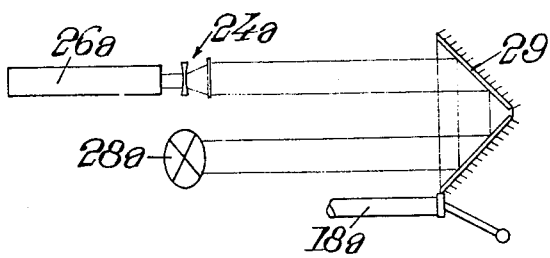
FIG. 4 is a diagram showing a modification of the device of FIG. 3.

Instead of using the arrangement shown in FIG. 3, it is possible to use that shown in FIG. 4 to increase the accuracy in measuring $(\Delta M)_x$ and $(\Delta M)_z$. The detector 28a, like the source 24a, is fixed on the headstock whilst the end of the arm 18a carries a reflector 29 (generally a trirectangular trihedral prism).

It is thus possible to arrive at an accuracy in the micron range over a distance of about one meter under laboratory conditions.

Figure 5:
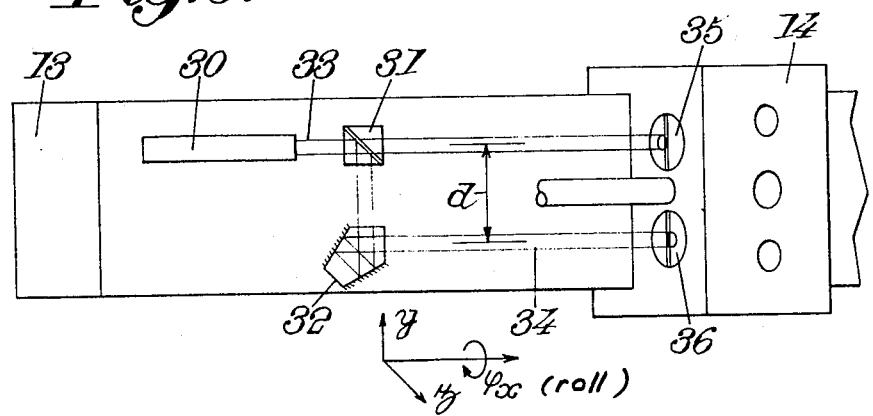
FIG. 5 is a diagram of a device for measuring the roll errors around the axis of translation Ox.

The measurement of angle $\theta_z$ and, if necessary, that of angle $\phi_x$ can be carried out similarly. As an example, FIG. 5 shows a device for determining the error $\phi_x$ due to roll of the carriage 14 caused by the screw which drives the carriage.

The device again includes a light source 30 supplying a cylindrical light beam 33. The source 30, typically a laser, is borne by the measuring bench 13 and it is angularly located to provide a beam parallel to direction x, at a distance d/2 from the vertical plane passing through the axis of the screw which drives carriage 14. A semi-transparent mirror 31 and an optical reflector 32 which changes the light direction by 90° take up, from the beam 33 emerging from the source 30, a reflected beam whose intensity is approximately half the intensity of the incident beam and return it along a path 34 symmetrical with the beam 33 with respect to the axis of the drive screw of the carriage 14 (FIG. 5).

The carriage 14 bears, arranged symmetrically with respect to the screw, two light detectors 35 and 36, each having two sectors separated by a mid line parallel to the common plane of the beams 33 and 34. Symmetry of the detectors 35 and 36 with respect to the axis of the screw is not however indispensable.

Figure 6:
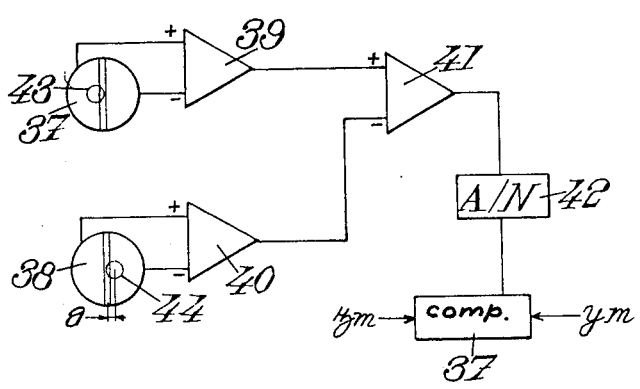
FIG. 6 is a diagram of a computing circuit associated with the device of FIG. 5.

The detectors 35 and 36, which may be of the same type as those of FIG. 3, are associated with an electrical analog circuit. In the circuit shown by way of example in FIG. 6, the differential amplifiers 39 and 40 determine the differences of illumination received by the two sectors of the detectors 35 and 36. The outputs of amplifiers 39 and 40 are applied to the inputs of a second differential amplifier 41 acting as a subtractor. Finally, the output from subtractor 41 is applied to a conventional analog-digital convertor 42.

When the images 43 and 44 of the beams 33 and 34 are not centered on the detectors 35 and 36, as a result of roll, the differential amplifier 41 provides an output signal proportional to $x_1 - x_2$ ($x_1$ and $x_2$ being the output signals from 39 and 40). Since the angle $\phi_x$ is small, it is given by:

$$\phi_x = \frac{a}{d} \propto \frac{x_1 - x_2}{d}$$

a being the deviation between the centroids of spots 43 and 44, as represented by the signals. The output from the A/D convertor 42 can be applied to a computer 37 the memory of which stores the distance d and which further receives numerical data representative of $y_m$ and $z_m$, so as to deliver the appropriate corrective terms to the memory of the display unit.

If such a correction is carried out, it is necessary to have values $y_m$ and $z_m$ reckoned from the carriage for $z_m$, from the headstock for $y_m$. Consequently, the simplification consistant with taking the first point of contact with the part as origin is no longer possible.

The measurement of $\theta_z$ can be carried out in the same way as that of $\phi_x$, the light source being this time placed on the carriage and the detectors on the headstock.

In formulae (2), the effect of errors other than $(\Delta M)_x$, $(\Delta M)_y$, $\theta_z$ and $\phi_x$ is assumed negligible. It may be desirable to check that these errors are in fact negligible. This check can be carried out by means of a deflection measuring device, similar to that of FIGS. 5 and 6, but modified to provide data on the magnitudes of several different errors.

Referring to FIG. 7, there is shown in diagrammatic form an arrangement for measuring $\theta_y$ (pitch) and $\theta_x$ (yaw) simultaneously. The arrangement comprises a light source 45 (for instance helium-neon laser) borne by the carriage 14 and whose output beam is parallel to axis $O_1z$. The headstock bears a semi-transparent mirror 46. A fraction of the intensity of the beam passes through the mirror and reaches a four quadrant detector 47. The remainder, reflected at 90° by the error 46, arrives at a detector 48 similar to the detector 47, placed at the same distance $d_1$ from the image of the detector 47 at the semi-reflecting mirror 46.

If the differential signals supplied by the detector 47 in directions x and y are denoted by $X_1$ and $Y_1$, and the corresponding values supplied by the detector 48, by $X_2$ and $Y_2$, we have, as long as the angles $\theta$ are small:

$$\begin{cases} \theta_y = (X_2 - X_1)/d \\ \theta_x = (Y_2 - Y_1)/d \end{cases}$$

If, in addition to $\phi_x$, the angles $\phi_y$ and $\phi_z$ as well as the deviations $(\Delta O)_1$ and $(\Delta O_1)_z$ are to be measured, the device of FIG. 5 may be amplified as indicated diagrammatically in FIG. 8. The light source 49 borne by the bench emits a cylindrical light beam which a semi-reflection mirror 50 and an optical reflecting unit 51, also borne by the bench, split into two beams 52 and 53 symmetrical with respect to the optical axis of movement and to distance d from one another. A first fraction of the intensity of beam 52 is directly received by a four quadrant detector 54 which supplies differential signals $Y_1$ and $Z_1$. A semi-reflecting mirror 55 returns the remainder of the intensity of the beam 52 at 90° to a four quadrant detector 56, which supplies differential signals $X_3$ and $Z_3$. Finally, the beam 53 arrives at a four quadrant detector 57 which supplies differential signals $Y_2$ and $Z_2$. The detectors 54, 56 and 57 are borne by the carriage. If, by the same method, it is desired to measure the angles $\theta_x$, $\theta_y$ and $\theta_z$, a laser similar to 49, a semi-reflecting mirror similar to 50 and an optical reflecting unit similar to 51 would be borne by the carriage whilst detectors and a semi-reflecting mirror similar to 55 would be borne by the headstock.

In the present case, the angles $\phi_x$, $\phi_y$ and $\phi_z$ are obtained using two-by-two combinations of the output signals x, y and z from the detectors 54, 56 and 57. The signals also provide $(\Delta O_2)_x$ and $(\Delta O_2)_y$.

Numerous modifications are possible. For instance, the invention may be embodied in a machine for measuring in polar coordinates, comprising a central column defining axis Oz, along which a headstock is movable which carries, through a graduated circle, an arm provided with a feeler and movable radially with respect to axis Oz. In the same way, the invention is applicable when the movements of x, y and z are effected in a different order along the linkage.

Whatever the embodiment selected, a high degree of accuracy is achieved, while the components to be added to a conventional machine (whose general constitution remains unchanged) are simple and of relatively low cost. Operation is not substantially modified, particularly if the machine has a direct digital display.

We claim:

1. Machine for measuring the dimensions of a workpart, comprising a base plate constructed to receive the workpart, a mechanical structure bearing a feeler movable along orthogonal axes, devices carried by said structure for direct measurement of the movement of the feeler along said axes, optical deflection measurement means operatively associated with said structure for determining the errors of measurement or of movement due to play and deformation of movable component members of said mechanical structure along at least one of said axes and for providing electric signals representative of said errors; and computing means connected to receive said electrical signals and for computing the corrections to be made to the results provided by said devices for direct measurement.

2. Machine according to claim 1, wherein said means for determining the errors corresponding to the movement along one of said axes comprises a light source placed close to the origin of said one axis, emitting a cylindrical beam of light parallel to a theoretical direction of said axis of movement and a detector of the deviations of one of the movable members which is movable along said axis with respect to said theoretical direction.

3. Machine according to claim 2, wherein the light source is a laser.

4. Machine according to claim 1, comprising, along at least one of said axes, a direct read-out measuring device borne by the member movable along said axis and cooperating with a scale borne by said axis and supplying an indication of the amount of movement in digital form, said optical deflection measurement means comprising optical detector means, an analog-digital converter and a computer being provided which receives the data supplied by the read-out and by the analog-digital converter and delivers a corrected measurement to a display device.

5. A machine for measuring the dimensions of a workpiece, comprising:
   a base plate for receiving said workpiece
   a mechanical structure comprising:
      a first member movable along a first direction Ox with respect to the base plate,
      a second member displaceable with respect to the first member along an axis $O_1z$ perpendicular to the first direction Ox, and
      a third member movable with respect to the second member along an axis $O_2y$ perpendicular to the directions Ox and $O_1z$, and
      a feeler carried by said third member, means for determining, by optical deviation measurement, the measuring errors due to lost motion and deformation of the components of the mechanical structure along at least one of said axes, comprising:
      a source borne by the second member, emitting a cylindrical light beam parallel to said axis $O_2y$,
      optical detector means borne by the third member, located to receive said light beam, and electrical means associated with said optical detector means for determining the errors along said directions Ox and $O_1z$.

6. Machine according to claim 5, wherein said error determining means are constructed to determine the error due to roll of at least one of said second and third members with respect to said first or second member of the structure, respectively, and comprise:

an assembly borne by said preceding member and including a source of light supplying a light beam parallel to said axis, a semi-reflecting mirror and an optical reflector taking from the beam emerging from the source a part of intensity and returning it along a path parallel to the beam and symmetrical with respect to the axis of movement, an assembly borne by said movable member and including two detectors arranged to receive said beam, each having at least two sectors separated by a mid line parallel to the plane of said beam and of said path, and electrical comparison means for comparing the amounts of light received by conjugate pairs of sectors of the detectors.

7. Machine according to claim 5, wherein said error determination members are constructed for simultaneously measuring the errors due to yaw and to pitch of at least one of said second and third members movable along an axis with respect to the first or second member of the mechanism, respectively, in addition to the errors due to roll, and comprises:

an assembly borne by said preceding member and including a source of light supplying a light beam parallel to said axis, a semi-reflecting mirror and optical reflector means taking part of the intensity from the beam emerging from the source and sending it back along a path parallel to said beam and symmetrical with respect to said axis of movement;

an assembly borne by said movable member and including two detectors arranged to receive said beams, each with four quadrants, separated by mid lines advantageously parallel to the pitch and yaw axes or at 45° to the latter, as well as a third detector with four quadrants receiving the light sent back at 90° by a semi-reflecting mirror borne by the movable member, and an electrical circuit for processing pairs of differential signals supplied by said detectors.

8. A machine for machining a workpiece, comprising a base plate for receiving the workpiece, a mechanical structure carrying a cutting tool and mounted to be movable along orthogonal axes, means on said mechanical structure for controlling the movement of said tool along said axes, optical deflection measurement means on said mechanical structure for determining the errors of movement due to deformation of the components of the mechanical structure along at least one of said axes and computing means coupled to said deflection measurement means for computing corrections to be made in locating said tool.

* * * * *